Jan. 26, 1937.     S. OPPENHEIM     2,069,112
DEVICE FOR TREATING THE TOOTH ROOT MEMBRANE
Filed Jan. 3, 1933

S. Oppenheim
INVENTOR

By: Marks & Clerk
Attys.

Patented Jan. 26, 1937

2,069,112

UNITED STATES PATENT OFFICE 2,069,112

DEVICE FOR TREATING THE TOOTH-ROOT MEMBRANE

Sally Oppenheim, Erfurt, Germany

Application January 3, 1933, Serial No. 649,991
In Germany January 14, 1931

1 Claim. (Cl. 128—409)

My invention relates to a device for treating the tooth membrane in order to heal inflammations thereof.

Such inflammations (tooth ache) are often very painful and require treatment of long duration, trying severely the patience of the sufferer as well as that of the dentist.

Inflammations of the tooth membrane were treated heretofore by introducing medicaments into the cavity of the tooth after extracting its nerve. As a rule, the medicament requires repeated renewing before the healing process is completed. This necessitates several, and often many, visits at the dentist's and the pain often is present for many days.

It is an object of my invention to eliminate the drawbacks of the aforesaid treatment by medicaments.

To this end, I dispense with medicaments altogether and instead I employ a device constituting an electric couple which is adapted to be inserted in the cavity of the tooth.

In a preferred embodiment of my invention, I make the couple of a gold and silver wire connected by gold solder.

My novel device for the treatment of the membrane of the tooth root heals the inflammation of the membrane in a short time and without renewing. The device has the shape of a pin or wire and is inserted in the cavity or passage occupied by the nerve. If extraction of the nerve is undesirable or impracticable, the device can be bent so as to contact with the entrance of inaccessible nerve passages. In this case as well as after the extraction of the nerve, it exerts its healing action on the nerve.

The healing action of the new insertion embodying my invention is probably due to its action as an electric local couple whose current causes the healing of the inflamed root membrane.

As mentioned, my device need not be renewed or exchanged during the treatment, nor is it necessary to exchange it for a permanent insertion after the treatment has been finished, but the device itself is left in the cavity of the tooth and cemented therein after the treatment.

I have found that a device consisting of a gold and a silver wire and gold solder connecting the two wires, is particularly efficient. With a device of this type, the pain was perceptibly relieved in about 24 hours and disappeared altogether in a comparatively short time, without re-appearing later.

In the accompanying drawing, a tooth with a device embodying my invention inserted in the cavity of its root, is illustrated in section and on a magnified scale.

In the drawing—

Figure 1:
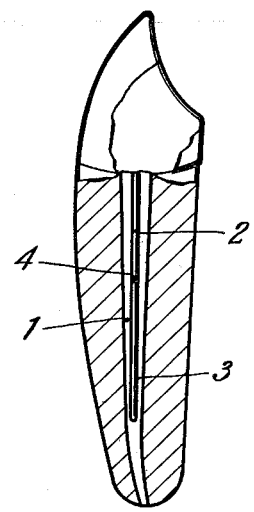
Fig. 1 shows the device inserted.

Referring now to the drawing, $a$ is the tooth, 1 is the cavity or passage in its root, 2 is a silver wire, 3 is a gold wire, and 4 is gold solder connecting the two wires.

Figure 2:
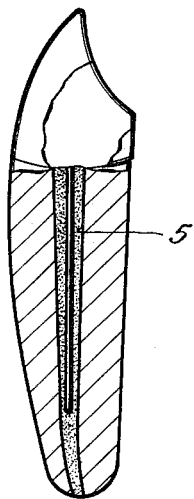
Fig. 2 shows it cemented, in the cavity.

Fig. 1 shows the device or couple inserted in the passage 1 for treatment. Fig. 2 shows it embedded in a layer of cement 5 after the treatment has been completed.

I claim:

A device for treating inflammations of the tooth-root membrane, comprising an electric couple consisting of a gold and a silver wire connected end to end by gold solder and adapted to be inserted in the cavity of the tooth.

SALLY OPPENHEIM.